(12) United States Patent
Talit

(10) Patent No.: US 11,793,107 B2
(45) Date of Patent: Oct. 24, 2023

(54) GARDENING MATERIAL DISPENSING APPARATUS

(71) Applicant: Uzi Talit, Lakeland, FL (US)

(72) Inventor: Uzi Talit, Lakeland, FL (US)

( * ) Notice: Subject to any disclaimer, the term of this patent is extended or adjusted under 35 U.S.C. 154(b) by 0 days.

(21) Appl. No.: 17/785,637

(22) PCT Filed: Sep. 1, 2021

(86) PCT No.: PCT/IL2021/051072
§ 371 (c)(1),
(2) Date: Jun. 15, 2022

(87) PCT Pub. No.: WO2022/190078
PCT Pub. Date: Sep. 15, 2022

(65) Prior Publication Data
US 2023/0086914 A1 Mar. 23, 2023

Related U.S. Application Data

(60) Provisional application No. 63/159,661, filed on Mar. 11, 2021.

(51) Int. Cl.
*A01C 15/02* (2006.01)
*A01C 7/02* (2006.01)
(Continued)

(52) U.S. Cl.
CPC .......... *A01C 15/02* (2013.01); *A01C 7/02* (2013.01); *A01M 9/0069* (2013.01); *B65G 65/44* (2013.01)

(58) Field of Classification Search
CPC ............................ A01C 5/02; A01C 15/02
See application file for complete search history.

(56) References Cited

U.S. PATENT DOCUMENTS 1,793,197 A * 2/1931 Speicher ............... A01C 15/02
239/102.1
3,260,417 A * 7/1966 Paxson ................. A01C 15/02
222/191

(Continued)

FOREIGN PATENT DOCUMENTS

EP 2153714 A1 2/2010
EP 2371759 A1 10/2011
(Continued)

OTHER PUBLICATIONS

PCT International Search Report for International Application No. PCT/IL2021/051072, dated Dec. 6, 2021, 5pp.
(Continued)

*Primary Examiner* — Jeremy Carroll
(74) *Attorney, Agent, or Firm* — The Roy Gross Law Firm LLC; Roy Gross

(57) ABSTRACT

A gardening material dispensing apparatus configured for dispensing gardening material. The gardening material dispensing apparatus includes a convertible container assembly configured to contain a supply of the gardening material, a dispensing conduit configured to flow the gardening material from the container assembly continually based on gravity to a selected area, and at least one material agitator assembly operably coupled to the dispensing conduit and configured to controlled quantities of the gardening material by controlling a speed of rotation of an agitator impeller.
The dispensing conduit dispenses a precise amount of the gardening material continuously onto the selected area.

20 Claims, 12 Drawing Sheets

(51) Int. Cl.
*A01M 9/00* (2006.01)
*B65G 65/44* (2006.01)

(56) References Cited

U.S. PATENT DOCUMENTS

| | | | | |
|---|---|---|---|---|
| 5,862,940 | A * | 1/1999 | Chism | B65D 37/00 |
| | | | | 220/666 |
| 6,089,477 | A * | 7/2000 | Dillon | A01C 15/02 |
| | | | | 239/653 |
| 6,729,558 | B1 * | 5/2004 | Seenauth | B05B 7/1427 |
| | | | | 239/152 |
| 8,640,925 | B1 * | 2/2014 | Schwegman | A01C 15/02 |
| | | | | 222/449 |
| 2003/0233969 | A1 * | 12/2003 | Stolz | A01C 15/02 |
| | | | | 172/378 |
| 2005/0268829 | A1 * | 12/2005 | Longo | A01C 15/02 |
| | | | | 111/92 |
| 2010/0083885 | A1 * | 4/2010 | Modaresi | A01C 15/02 |
| | | | | 111/95 |
| 2010/0327087 | A1 * | 12/2010 | Harris | E01C 19/2005 |
| | | | | 239/653 |
| 2012/0205398 | A1 * | 8/2012 | Steingrandt | A01C 15/02 |
| | | | | 222/378 |
| 2013/0068861 | A1 * | 3/2013 | Zwahlen | A01C 15/02 |
| | | | | 239/653 |
| 2013/0099028 | A1 * | 4/2013 | Richard | A01C 15/02 |
| | | | | 239/668 |
| 2014/0352584 | A1 * | 12/2014 | Shaffer | B65G 65/46 |
| | | | | 111/95 |
| 2016/0332177 | A1 * | 11/2016 | Dillon | B05B 7/1486 |
| 2021/0253412 | A1 * | 8/2021 | Nolan | A01C 15/02 |

FOREIGN PATENT DOCUMENTS

| | | |
|---|---|---|
| EP | 2441325 A1 | 4/2012 |
| FR | 2808412 A1 | 11/2001 |
| JP | 2000236760 A | 9/2000 |
| KR | 200282125 Y1 | 7/2002 |
| WO | 2004060047 A2 | 7/2004 |
| WO | 2013100866 A1 | 7/2013 |
| WO | 2018229792 A2 | 12/2018 |
| WO | WO-2018229792 A3 * | 4/2019 ............ A01C 15/02 |

OTHER PUBLICATIONS

PCT Written Opinion for International Application No. PCT/IL2021/051072, dated Dec. 6, 2021, 6pp.

* cited by examiner

GARDENING MATERIAL DISPENSING APPARATUS

CROSS REFERENCE TO RELATED APPLICATIONS

This application is a National Phase of PCT Patent Application No. PCT/IL2021/051072 having International filing date of Sep. 1, 2021, which claims the benefit of priority of U.S. Provisional Patent Application No. 63/159,661, filed Mar. 11, 2021, the contents of which are all incorporated herein by reference in their entirety.

TECHNICAL FIELD

Some embodiments described herein generally relayed to fertilizers and, more specifically, to gardening material dispensing apparatus.

BACKGROUND

Gardeners take pride in their lawns. It requires regular maintenance such as cutting, trimming, and fertilizing. Materials such as fertilizer, pesticide, weed-killing chemicals, grass seeds, and the like may be dispensed over all or a portion of the area using a fertilizer spreader. A conventional fertilizer spreader may include a hopper that contains and dispenses the material onto a spinning, bladed plate. The spinning plate broadcasts the gardening material outwardly from the hopper over the area. Conventional fertilizer spreaders, however, are characterized by poor control of the exact location and variable amount of the material.

Nurseries may maintain hundreds or thousands of potted plants, many of which may require regular fertilization. One of the challenges of properly maintaining such plants is regularly supplying the correct quantity of nutrients to the plants. To this end, nurseries may apply dry time-release dry fertilizers to the soil in which each plant grows. In some applications, the fertilizer may be applied to the soil manually using a cup or a spoon. In other applications, a mechanical applicator may be used for the purpose. commercial nurseries are using devices that are designed to deliver predetermined repetitive amount without the ability to change it on the fly or deliver continuous flow.

Home gardeners may cultivate and maintain their own gardens. However, cultivating and maintaining a home garden may require that the garden caretaker bend down on the caretaker's knees for prolonged periods of time. Many such persons, however, particularly those who are older, may have hip, back or knee problems which may be exacerbated by maintaining such a posture. Moreover, the application of fertilizer may require that the fertilizer be applied to the plants in the garden from beneath the plants or around it. For example, in the case of pineapple plants or avoid getting into the plant such as lettuce or cabbage for example, the fertilizer should be applied beneath the plant since the V-shaped configuration of the pineapple leaves may otherwise direct the fertilizer directly into the stem, potentially resulting in the death of the plant and avoid being eaten if falls into the lettuce or cabbage.

Existing fertilizer applicators may be difficult and uncomfortable to use to use or reach far. Some types of fertilizer applicators may not enable a user to control the quantity and exact location of the material dispensed.

Accordingly, there is a need to cure the above-described disadvantages.

SUMMARY

Embodiments of this disclosure may be related to a gardening material dispensing apparatus configured for dispensing material. The gardening material dispensing apparatus may include a convertible container assembly configured to contain a supply of the material, a dispensing conduit configured to flow the gardening material from the container assembly continually based on gravity to a selected area, and at least one gardening material agitator assembly operably coupled to the dispensing conduit and configured to controlled quantities of the material by controlling a speed of rotation of an agitator impeller, wherein the dispensing conduit dispenses a precise amount of the material continuously onto the selected area in a desired configuration.

For example, the material agitator assembly may include an at least one bladed agitator impeller configured to rotate in the dispensing conduit to break up clumps of the material and to allow a continuous flow of the gardening material.

For example, the gardening material dispensing apparatus may include a vibrator configured to vibrate the dispensing conduit to provide a smooth flow of the gardening material.

For example, the gardening material dispensing apparatus may include a material distributor configured to break up the soil as the gardening material is dispensed onto the soil and mixes the gardening material with the broken-up soil, wherein the material distributor is vibrating by a vibrator.

For example, the gardening material may include at least one of supply of grains, a fertilizer, a pesticide, a weed-killing chemical.

For example, the container assembly may be configured to expand according to the amount of the material needed.

For example, according to a first embodiment, controlling the speed of rotation of the agitator impeller may be done manually.

For example, according to a second embodiment, an agitator motor may be configured to rotate the gardening material through a drive coupling; and a variable speed controller operably coupled to the agitator motor and configured to control a speed of the agitator motor.

For example, according to the second embodiment, the agitator motor is extended from the dispensing conduit and is drivingly engaged to a bladed agitator impeller.

For example, according to a third embodiment, the agitator motor is located beneath the convertible container assembly at one end and to the dispensing conduit.

For example, according to the third embodiment, the agitator motor is drivingly engaged to an auger.

For example, according to the first, second, and third embodiments, the gardening material dispensing apparatus may include a conduit hinge between a main conduit segment of a proximal conduit segment and a middle conduit segment wherein when the conduit hinge is configured to provide the folding ability to the dispensing apparatus.

For example, according to the first, second, and third embodiments, the gardening material dispensing apparatus may include a discharge segment configured to provide a precise dispending at the selected area.

For example, according to the first, second, and third embodiments, the gardening material dispensing apparatus may include a distal conduit segment configured to be telescopically extendable with respect to a middle conduit segment of the dispensing conduit.

For example, according to the first, second, and third embodiments, wherein the container assembly comprises an expandable hopper configured to be expended based on the amount of the gardening material.

These and other objects, features, and advantages of the present invention will become more readily apparent from the attached drawings and the detailed description of the embodiments, which follow.

BRIEF DESCRIPTION OF THE DRAWING

Some demonstrative embodiments will hereinafter be described in conjunction with the appended drawings provided to illustrate and not to limit the invention, where like designations denote like elements, and in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the embodiment as oriented in FIG. 1.

Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise.

As shown throughout the figures, the present discloser is directed toward a gardening material dispensing apparatus suitable for precisely predetermined controlled quantities of fertilizer, pesticide, weed-killing chemical and/or other granular or particulate gardening material onto vegetation, soil or the like. A user of the apparatus maintains a standing posture.

Reference is first made to FIGS. 1-6, a gardening material dispensing apparatus, hereinafter dispensing apparatus 100, which is illustrated in accordance with one demonstrative embodiment.

Figure 1:
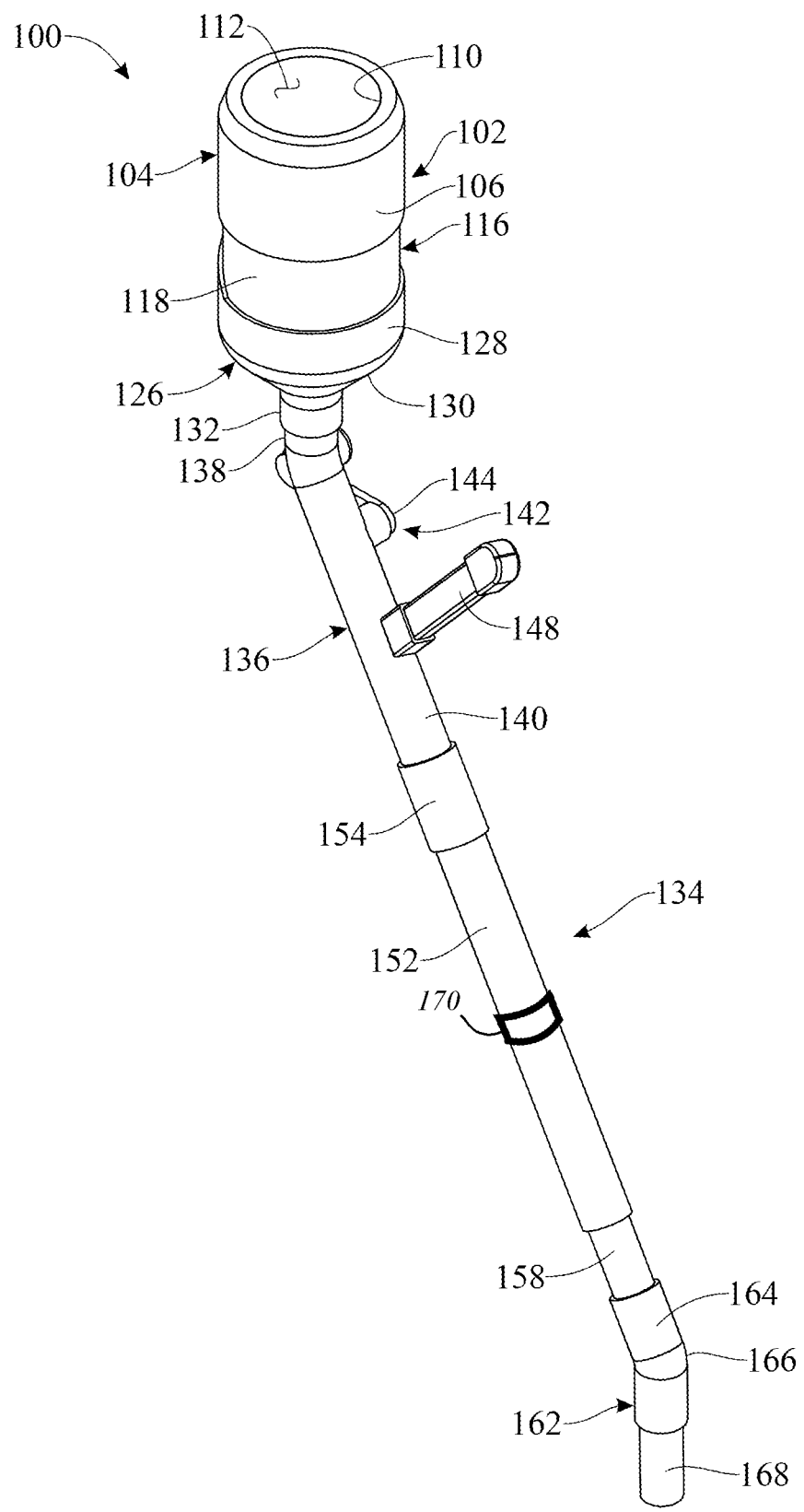
FIG. 1 is an illustration of a front perspective view of a gardening material dispensing apparatus according to some demonstrative embodiments.
Figure 5:
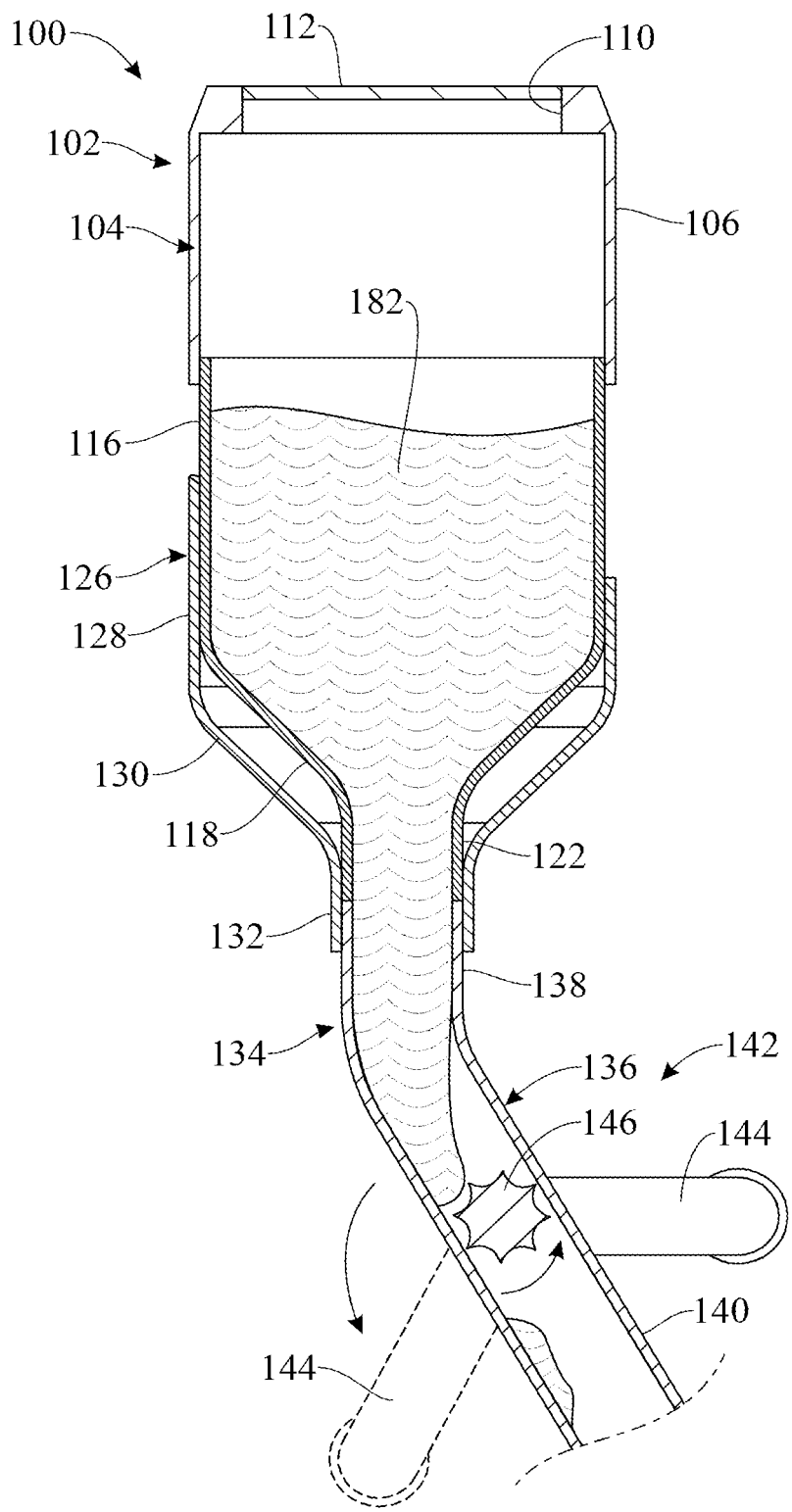
FIG. 5 is an illustration of a sectional view, taken along section lines 5-5 of FIG. 2, of the container assembly and proximal conduit segment of the dispensing conduit and the hand-operated material agitator assembly on the proximal conduit segment according to some demonstrative embodiments.

As shown, for example, in FIG. 1, the dispensing apparatus 100 may include a container assembly 102. As illustrated in FIG. 5, the container assembly 102 may be configured to contain a supply of grains and/or particulate fertilizer, pesticide, weed-killing chemical and/or any other material, hereinafter material 182. A dispensing conduit 134 may be configured to dispose of fluid from the container assembly 102. At least one material agitator assembly 142 may be provided in the dispensing conduit 134. Accordingly, controlled quantities of gardening material 182 can be dispensed from container assembly 102 through the dispensing conduit 134 and onto precisely controlled areas of, for example, the vegetation based on gravity. The material agitator assembly 142 rotational motion may be used to agitate and break up clumps in gardening material 182 to facilitate smooth flow of the gardening material 182 from the dispensing conduit 134 onto the vegetation.

Figure 3:
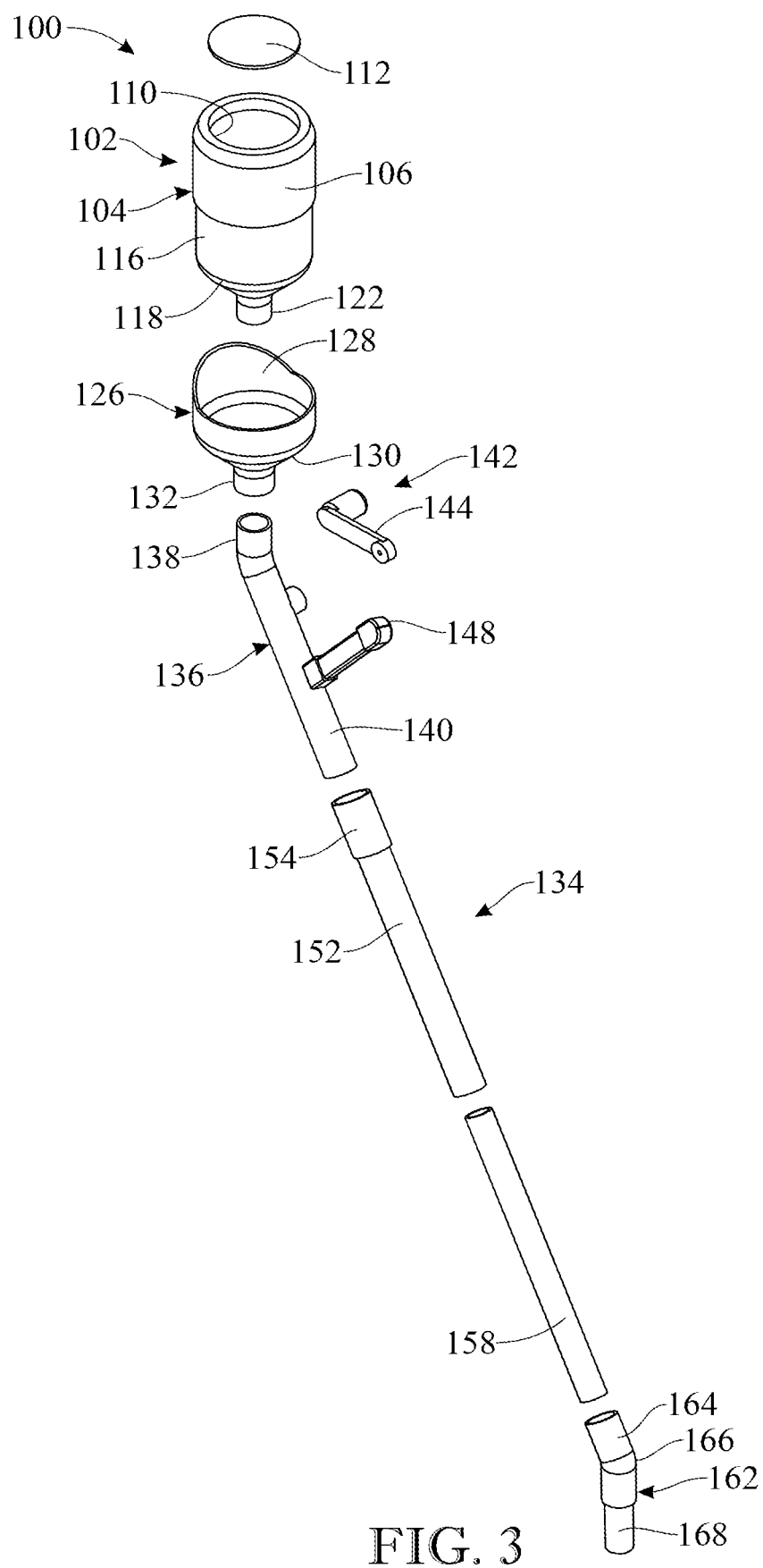
FIG. 3 is an illustration of an exploded front perspective view of the gardening material dispensing apparatus of FIG. 1 according to some demonstrative embodiments.

The container assembly 102 may include a container assembly base 126. As illustrated in FIG. 3, the container assembly base 126 may be configured to receive an inverted material container 104. As illustrated in FIG. 5, the material container 104 of the container assembly 102 may be configured to contain a supply of the granular or particulate gardening material 182.

In some demonstrative embodiments, as particularly illustrated in FIGS. 3 and 5, the container assembly base 126 of the container assembly 102 may include a base sidewall 128. The base sidewall 128 may be cylindrical. For example, a funnel-shaped base bottom wall 130 may extend from the base sidewall 128. A base connecting portion 132 may extend from the base bottom wall 130. The dispensing conduit 134 may be in fluid communication with the base connecting portion 132 of the container assembly base 126 and may be configured to dispose of the fluid.

In some demonstrative embodiments, as illustrated in FIGS. 3 and 5, the material container 104 of the container assembly 102 may include an upper container portion 106. A lower container portion 116 extending from the upper container portion 106. The upper container portion 106 and/or the lower container portion 116 may be cylindrical. A funnel-shaped container bottom 118 may extend from the lower container portion 116. A lower container connecting portion 122 may extend from the container bottom 118. As illustrated in FIG. 5, the container bottom 118 and the lower container portion 116 of the material container 104 may be suitably sized and configured to nest in the base bottom wall 130 and the base connecting portion 132, respectively, of the container assembly base 126.

In some demonstrative embodiments, at least one refill opening 110 may be provided in the upper container portion 106 of the material container 104. A removable refill cap 112 may be fitted in the refill opening 110. Accordingly, gardening material 182 may be placed in material container 104 through the refill opening 110 after removing the refill cap 112.

Figure 2:
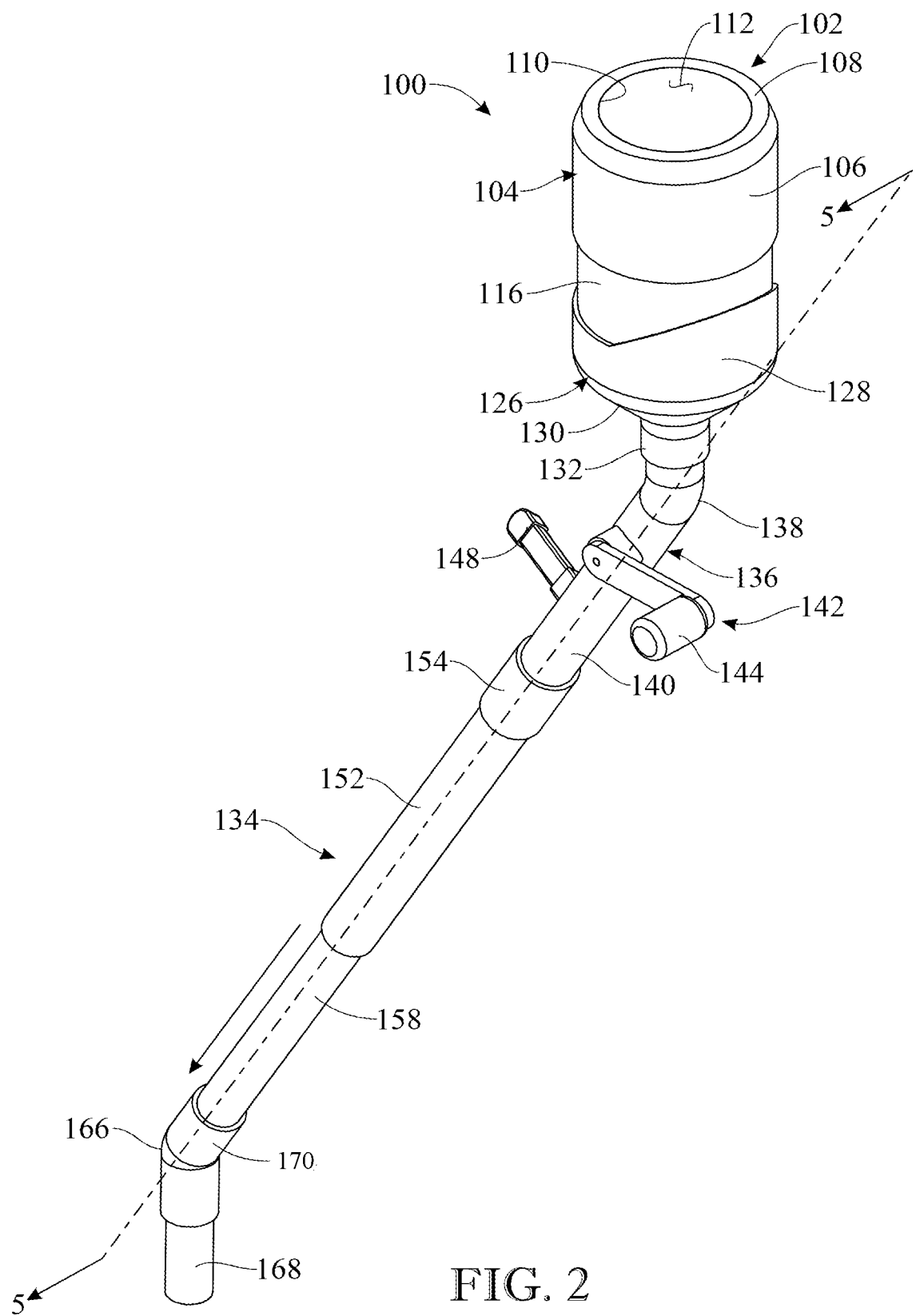
FIG. 2 is an illustration of a rear perspective view of the gardening material dispensing apparatus of FIG. 1 according to some demonstrative embodiments.

In some demonstrative embodiments, as illustrated in FIGS. 1-3, the dispensing conduit 134 may include a proximal conduit segment 136, which extends from the container assembly base 126 of the container assembly 102. A middle conduit segment 152 may extend from the proximal conduit segment 136. A distal conduit segment 158 may extend from the middle conduit segment 152.

In some demonstrative embodiments, the dispensing conduit 134 may include a vibrator 170. The vibrator 170 may be configured to vibrate the dispensing conduit 134 and may cause a smooth flow of the gardening material from the material container to the soil. Furthermore, the vibrator may be break up at least some clumps of the gardening material 182 while flowing along the dispensing conduit 134.

It should be understood that vibrator 170 may be attached to the dispensing conduit 134 at different places. For example, at FIG. 1, the vibrator may be attached to the middle conduit segment 152. At FIG. 2, the vibrator may be attached to the conduit connector 164 (not shown), and at FIG. 4 the vibrator may be attached to the conduit connector 176.

In this embodiment, a material distributor 180 may be vibrated by vibrator 170 and may be configured to break up the soil as the gardening material is dispensed onto the soil and mixes the gardening material with the broken-up soil in one pass.

Advantageously, the vibrator 170 may cause better scatter of the gardening material 182, better insertion of the gardening material 182 to the soil and prevent the fertilizer from sticking in the dispensing conduit 134, and the like.

In some demonstrative embodiments, as illustrated in FIG. 5, the proximal conduit segment 136 of the dispensing conduit 134 may be disposed at an obtuse angle with respect to the container assembly base 126 of the container assembly 102. The proximal conduit segment 136 may include an inlet portion 138 disposed in fluid communication with the container assembly 102. A main conduit portion 140 may extend from the inlet portion 138. The inlet portion 138 may insert through the base connecting portion 132 of the container assembly base 126. The inlet portion 138 may be secured in the base connecting portion 132 via friction-fit, adhesives and/or mechanical fasteners.

In some demonstrative embodiments, the middle conduit segment 152 may extend from the main conduit portion 140 of the proximal conduit segment 136. The middle conduit segment 152 may be connected or coupled to the main conduit portion 140.

In some demonstrative embodiments, for example, a conduit connector 154 may connect the middle conduit segment 152 to the main conduit portion 140 of the proximal conduit segment 136.

In some demonstrative embodiments, as illustrated in FIG. 2, the distal conduit segment 158 may be telescopically extendable with respect to the middle conduit segment 152 of the dispensing conduit 134. Accordingly, the length of the dispensing conduit 134 may be selected by telescopically extending or retracting the distal conduit segment 158 with respect to the middle conduit segment 152.

In some demonstrative embodiments, as illustrated in FIGS. 1-3, a terminal conduit segment 162 may extend from the distal conduit segment 158 of the dispensing conduit 134. The terminal conduit segment 162 may be oriented at an obtuse angle with respect to the distal conduit segment 158.

Accordingly, the terminal conduit segment 162 may include a conduit connector 164 operably connected to the distal conduit segment 158. An elbow 166 may extend from the conduit connector 164. A discharge segment 168 may extend from the elbow 166. In some demonstrative embodiments, the angle of the terminal conduit segment 162 may be selectively adjustable according to the knowledge of those skilled in the art.

Figure 4:
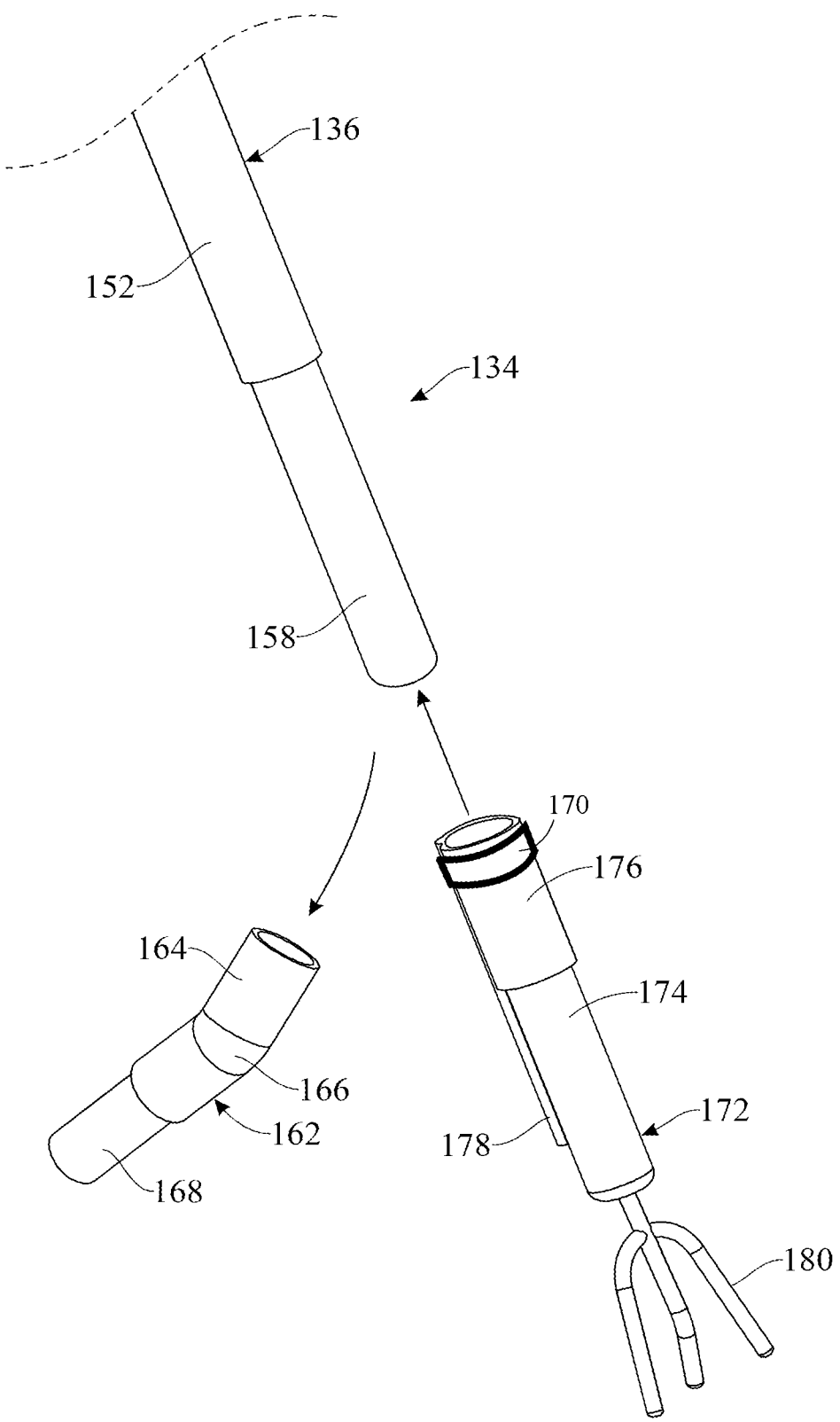
FIG. 4 is an illustration of an exploded perspective view of the middle and distal conduit segments of the dispensing conduit according to some demonstrative embodiments.
Figure 6:
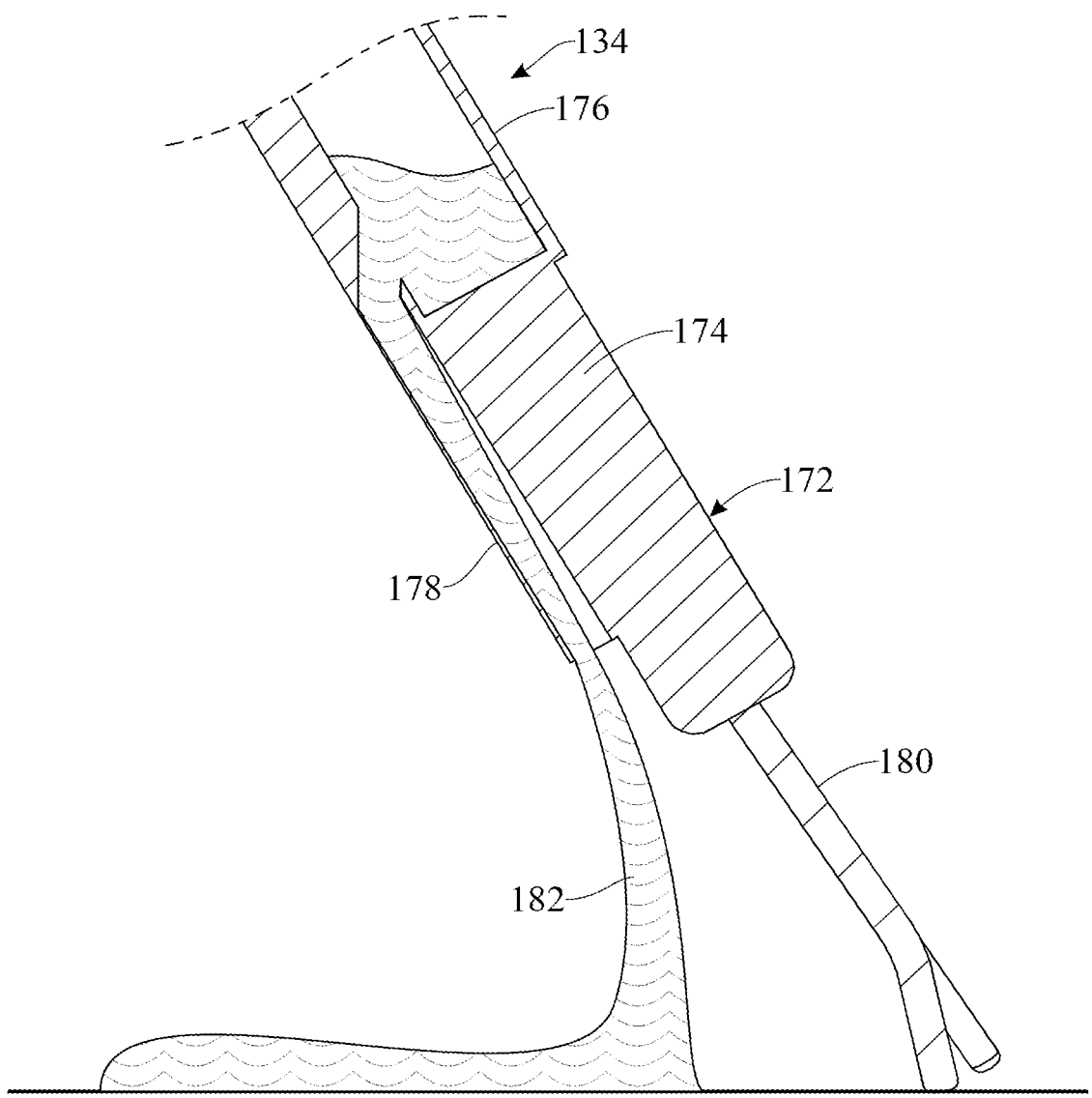
FIG. 6 is an illustration of an enlarged longitudinal sectional view of a terminal conduit segment on the dispensing conduit according to some demonstrative embodiments.

In some demonstrative embodiments, as illustrated in FIGS. 4 and 6, the terminal conduit segment 172 may include a conduit segment body 174 which extends from the distal conduit segment 158 of the dispensing conduit 134. The conduit segment body 174 of the terminal conduit segment 172 may be connected to the distal conduit segment 158 via a conduit connector 176.

In some demonstrative embodiments, as illustrated in FIG. 6, a dispensing portion 178 may extend within the conduit segment body 174. The dispensing portion 178 may be disposed in fluid communication with the distal conduit segment 158 of the dispensing conduit 134.

In some demonstrative embodiments, at least one material distributor 180 may extend from the conduit segment body 174 of the terminal conduit segment 172 for purposes which will be hereinafter described.

In this embodiment, the material distributor 180 may be configured to break up the soil as the gardening material is dispensed onto the soil and mixes the gardening material with the broken-up soil.

Advantageously, the material distributor 180 may cause better scatter of the gardening material 182, better insertion of the gardening material 182 to the soil, and prevent the fertilizer from sticking in the dispensing conduit 134, and the like.

In some demonstrative embodiments, as illustrated in FIG. 4, the terminal conduit segment 162 and the terminal conduit segment 172 may be configured for interchangeable attachment to the distal conduit segment 158 of the dispensing conduit 134 depending on the application of the dispensing apparatus 100.

In some embodiments, at least one handle 148 may be provided on the dispensing conduit 134. The handle 148 may be gripped by an operator (not illustrated) of the dispensing apparatus 100 to enable the operator to precisely maneuver and position the dispensing apparatus 100 in dispensing of the gardening material 182 onto the vegetation.

In some demonstrative embodiments, a carrying strap (not illustrated) may be attachable to the dispensing conduit 134. The carrying strap may enable the operator to carry the dispensing apparatus 100 over a shoulder or by hand during use.

In some demonstrative embodiments, as illustrated in FIG. 5, the material agitator assembly 142 may include at least one bladed agitator impeller 146 disposed in the dispensing conduit 134. For example, a manually operable agitator crank 144 may drivingly engage the agitator impeller 146 for rotation. Accordingly, by manual rotation of the agitator crank 144, the agitator impeller 146 may rotate in the dispensing conduit 134 to break up clumps of the gardening material 182 as gardening material 182 flows from the container assembly 102 through the dispensing conduit 134.

In some demonstrative embodiments, the material agitator assembly 142 may be provided in the main conduit portion 140 of the proximal conduit segment 136 in the dispensing conduit 134. In other embodiments, the material agitator assembly 142 may be provided in any other accessible location or position on the dispensing conduit 134.

In some demonstrative embodiments, the terminal conduit segment 162 or the terminal conduit segment 172 (FIG. 4), which fitted with the material distributor 180 (FIG. 4), may be fitted on the distal conduit segment 158 of the dispensing conduit 134. This may be accomplished, for example, by inserting the distal conduit segment 158 to the conduit connector 164 on the terminal conduit segment 162 or in the conduit connector 176 on the terminal conduit segment 172. The terminal conduit segment 172 with the material distributor 180 may be used in applications in which it is desired to break up the soil as the gardening material 182 is dispensed onto the soil and mix the gardening material 182 with the broken-up soil.

In some demonstrative embodiments, as illustrated in FIG. 5, a supply of gardening material 182 may be placed in material container 104 of container assembly 102. This may be accomplished by removing the refill cap 112 from the refill opening 110 and pouring the gardening material 182 through the refill opening 110 into the material container 104. The gardening material 182 may fall from material container 104 and into the inlet portion 138 of the proximal conduit segment 136 of the dispensing conduit 134. The agitator impeller 146 may initially substantially block the flow of the gardening material 182 through the main conduit portion 140 of dispensing conduit 134.

Throughout the operation of the dispensing apparatus 100, a user (not illustrated) of the dispensing apparatus 100 may assume and maintain a standing posture. While grasping the handle 148 (FIG. 2) with one hand and grasp the agitator crank 144 (FIG. 2) of the material agitator assembly 142 with the other hand, an operator (not illustrated) of the dispensing apparatus 100 may position the terminal conduit segment 162 (FIG. 4) or terminal conduit segment 172 (FIG. 4) over the vegetation (not illustrated) or the area of the soil in which the vegetation is to be grown. As the operator rotates the agitator crank 144, the agitator impeller 146 may rotate inside the dispensing conduit 134 and break up clumps in the gardening material 182 as well as facilitate controlled quantities of the gardening material 182 through the remaining portion of the dispensing conduit 134, from the terminal conduit segment 162 or 172 and onto the vegetation or soil. It will be appreciated by those skilled in the art that the operator can exercise precise control over the quantity of the gardening material 182 (FIG. 5), which is dispensed onto the vegetation or soil, by controlling the rotational speed of the agitator crank 144 (FIG. 1) and the agitator impeller 146 (FIG. 5). The dispensing apparatus 100 can be operated continuously until the entire supply of gardening material 182 is dispensed from container assembly 102. Gardening material 182 can be placed in material container 104 of the container assembly 102, as needed, by removing the refill cap 112 and pouring the gardening material 182 through the refill opening 110 into the material container 104.

Figure 7:
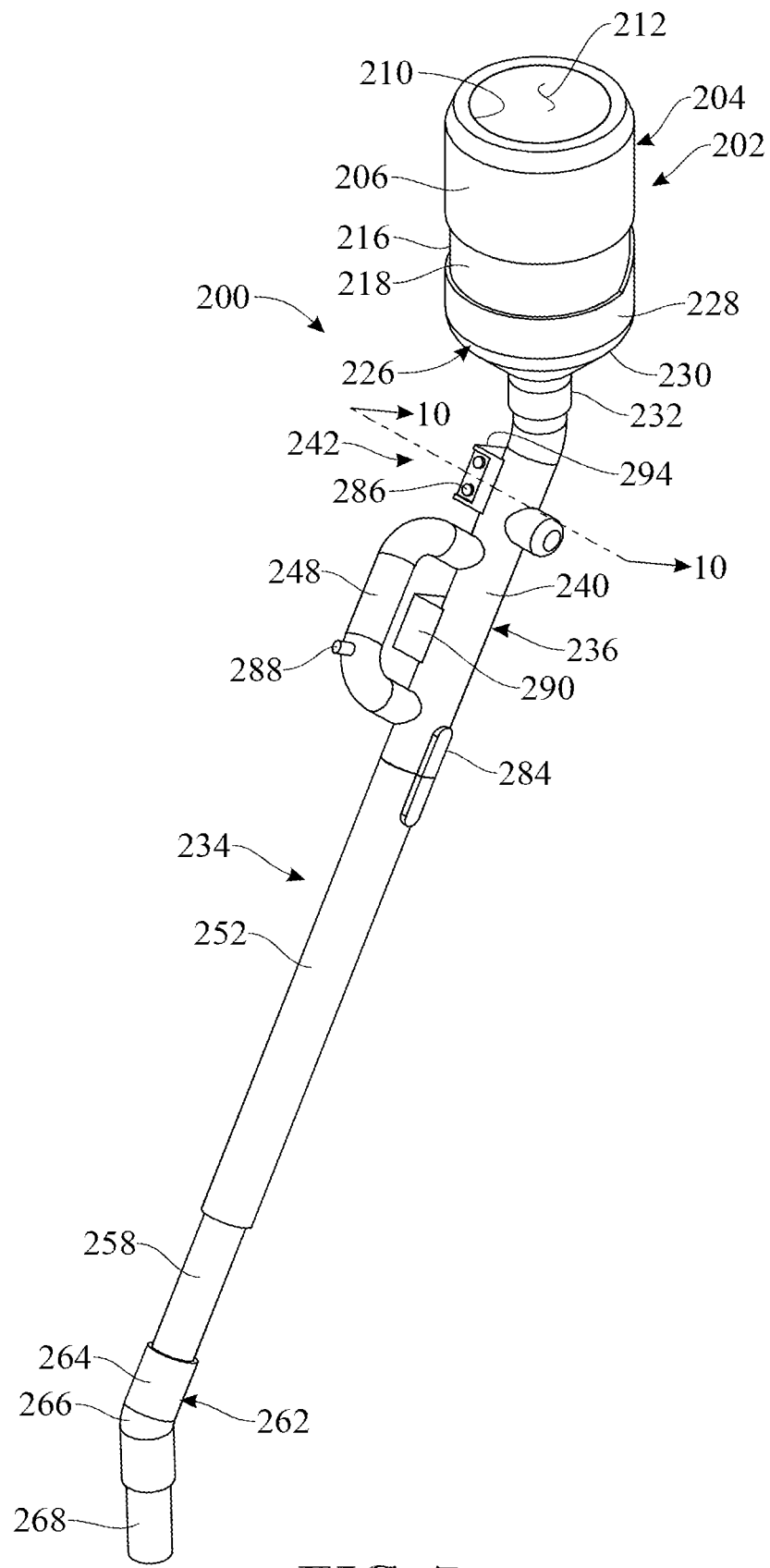
FIG. 7 is an illustration of a front perspective view of an alternative, motor-operated embodiment of the gardening material dispensing apparatus according to some demonstrative embodiments.
Figure 8:
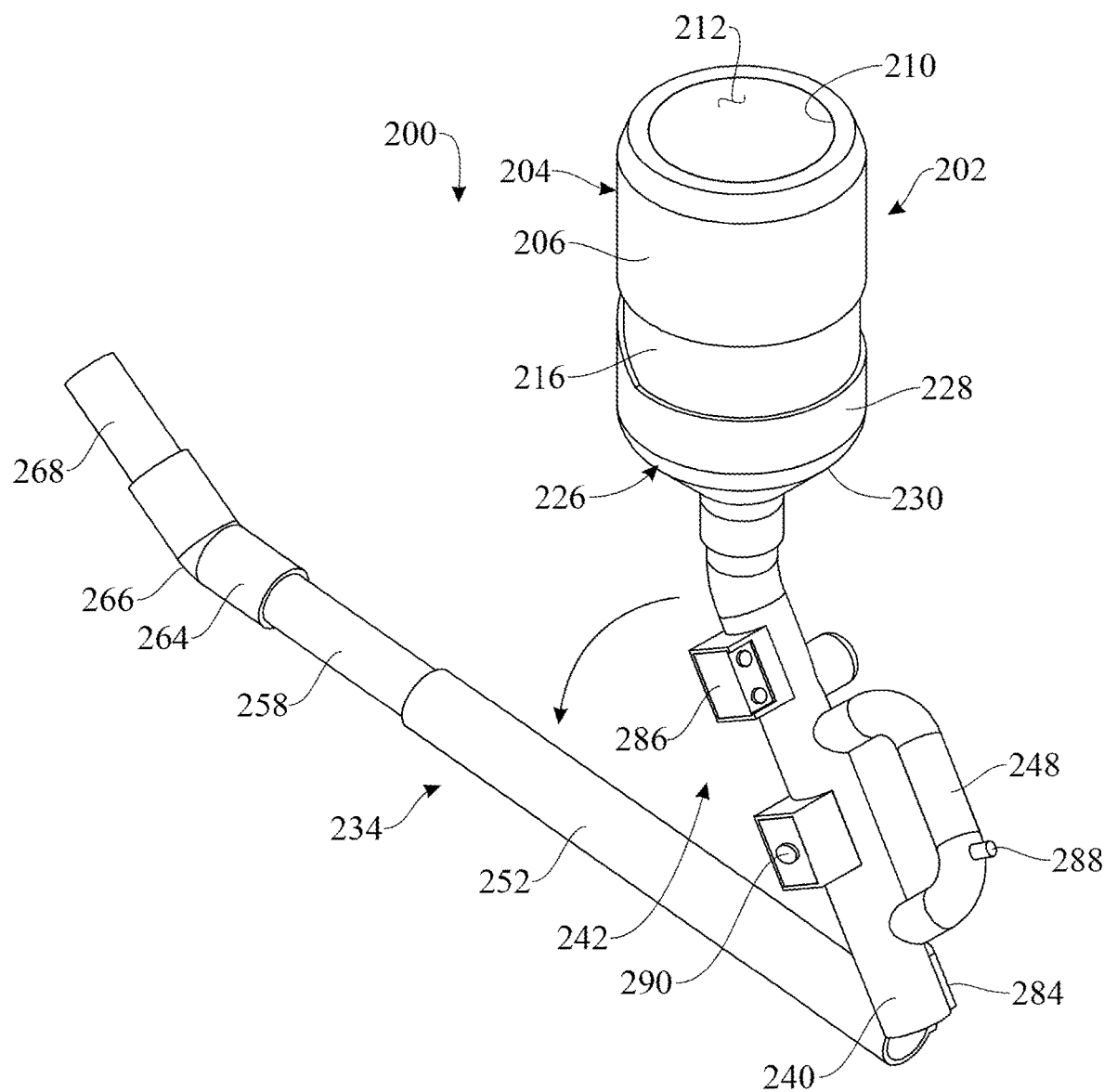
FIG. 8 is an illustration of a front perspective view of the gardening material dispensing apparatus of FIG. 7, with the dispensing conduit deployed in a partially folded, stowage configuration, according to some demonstrative embodiments.
Figure 9:
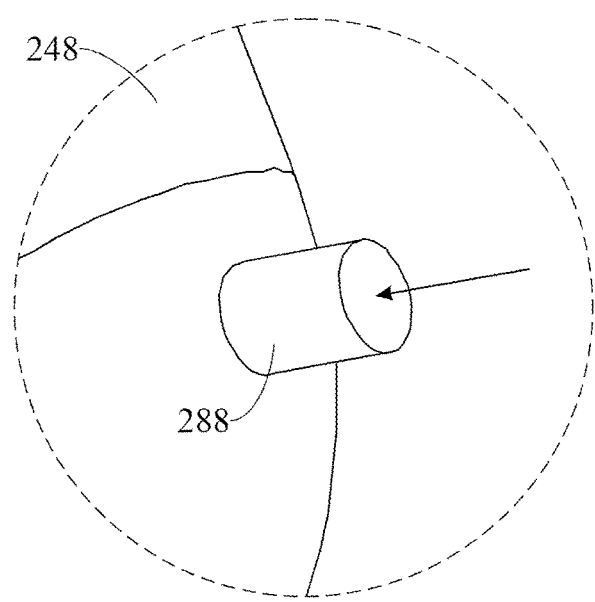
FIG. 9 is an illustration of an enlarged perspective view of a portion of a handle on the dispensing conduit of the material dispensing apparatus of FIG. 7 and a motor actuation button on the handle according to some demonstrative embodiments.

Reference is now made to FIGS. 7-9 of the drawings, an alternative, motor-operated embodiment of a gardening material dispensing apparatus 200. In the dispensing apparatus 200, elements which are analogous to the respective elements of the dispensing apparatus 100 were heretofore described with respect to FIGS. 1-6 may be designated by the same respective numerals in the 200-299 series in FIGS. 7-10.

Figure 10:
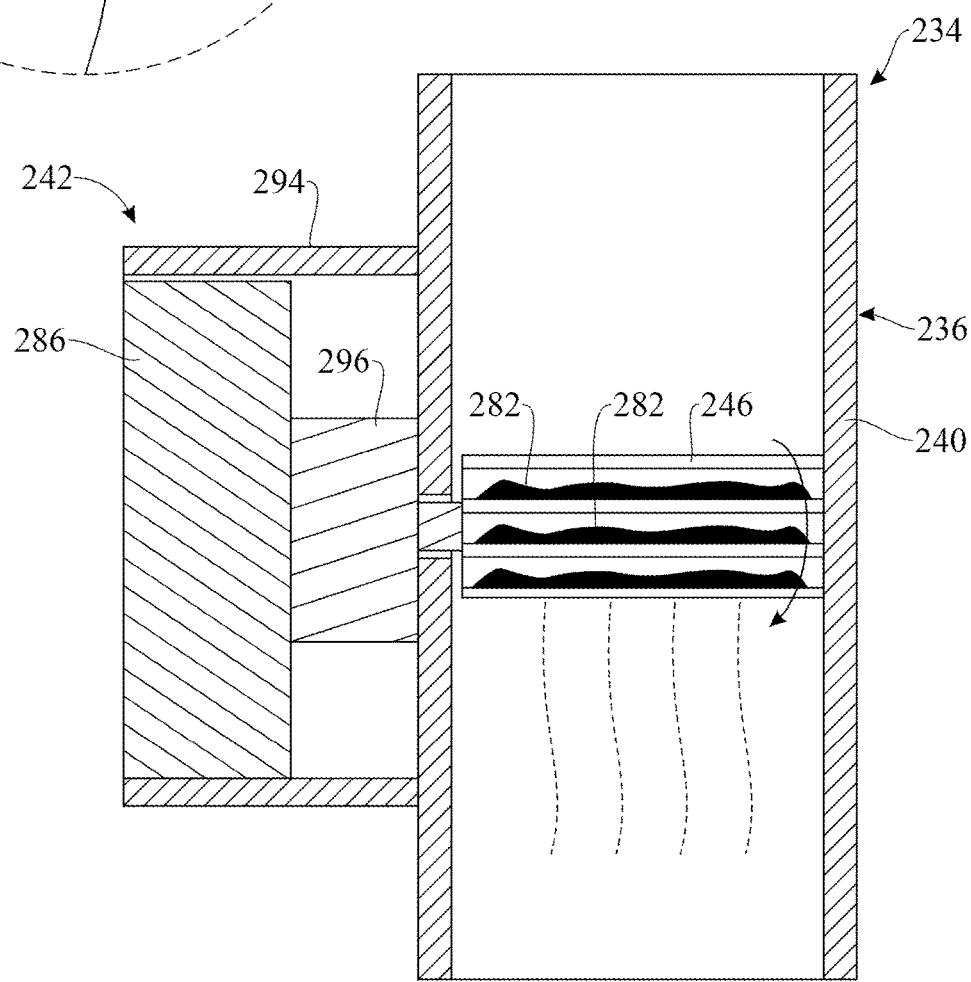
FIG. 10 is an illustration of an enlarged sectional view of the proximal conduit segment and material agitator assembly of the material dispensing apparatus of FIG. 7, taken along section lines 10-10, according to some demonstrative embodiments.

In some demonstrative embodiments, the material agitator assembly 246 (FIG. 10) may include a bladed agitator impeller 246 (FIG. 10) placed in the main conduit portion 240 (FIGS. 7, 8, 10) of the proximal conduit segment 236 (FIG. 10). An agitator motor 286 (FIGS. 7, 8, 10) may drivingly engage the agitator impeller 246 (FIG. 10) for rotation, for example, through a drive coupling 296 (FIG. 10).

In some demonstrative embodiments, the agitator motor 286 may be contained in a motor housing 294 (FIG. 10), which extends from the main conduit portion 240. As illustrated in FIG. 8, a rheostat-controlled variable speed control 290, e.g., a potentiometer, may operably interface with the agitator motor 286. The variable speed control 290 may facilitate manual control of the operational speed of the agitator motor 286.

In some demonstrative embodiments, a handle 248 may extend from the main conduit portion 240 of the proximal conduit segment 236. A motor actuation button 288, for example, may be provided on the handle 248. The motor actuation button 288 may electrically interface with the agitator motor 286 to facilitate a selective operation of the agitator motor 286, if desired.

In some demonstrative embodiments, as illustrated in FIGS. 7 and 8, the dispensing conduit 234 may be foldable for space-efficient transport and/or storage. Accordingly, a conduit hinge 284 may be provided in the dispensing conduit 234.

In some demonstrative embodiments, the conduit hinge 284 may be provided between the main conduit segment 240 of the proximal conduit segment 236 and the middle conduit segment 252. Accordingly, when the dispensing apparatus 200 is not in use, the dispensing conduit 234 can be folded at the conduit hinge 284, as illustrated in FIG. 8, to reduce the transport and/or storage size of the dispensing apparatus 200.

In some demonstrative embodiments, a conduit locking mechanism (not illustrated) may be provided on the dispensing conduit 234 to prevent inadvertent folding of the dispensing conduit 234 when not desired.

Application of the motorized dispensing apparatus 200 may be as was heretofore described with respect to the hand-operated dispensing apparatus 100 in FIGS. 1-6. Accordingly, the agitator motor 286 may rotate the agitator impeller 246 in the dispensing conduit 234 to facilitate and control the amount and the rate of flow of the material 282 from the container assembly 202 through the dispensing conduit 234 and onto the vegetation and/or soil (not illustrated). Operation of the agitator motor 286 may be initiated by manipulation of the motor activation button 288, which may be placed on the handle 248. The operational speed of the agitator motor 286 may be controlled by manipulation of the variable speed control 290.

Figure 11:
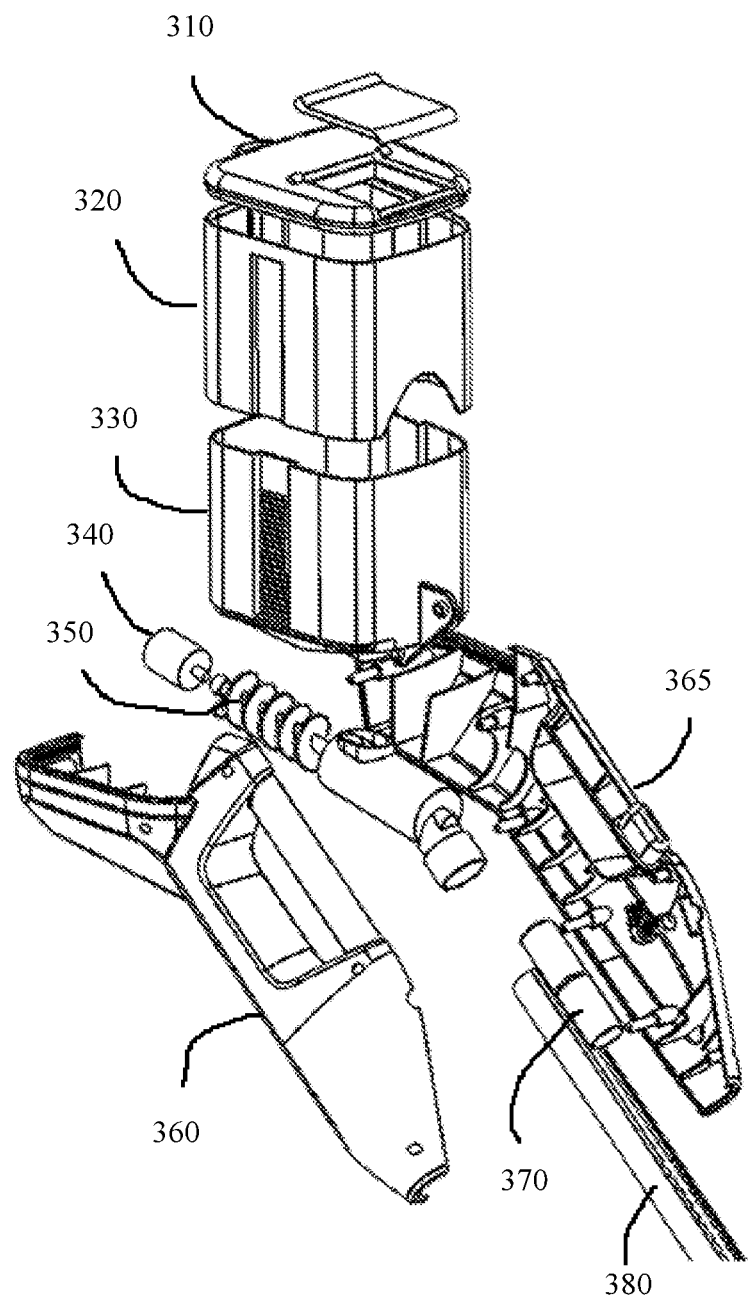
FIG. 11 is an illustration of a front perspective view of an upper section of a motorized gardening material dispensing apparatus according to some demonstrative embodiments.
Figure 12:
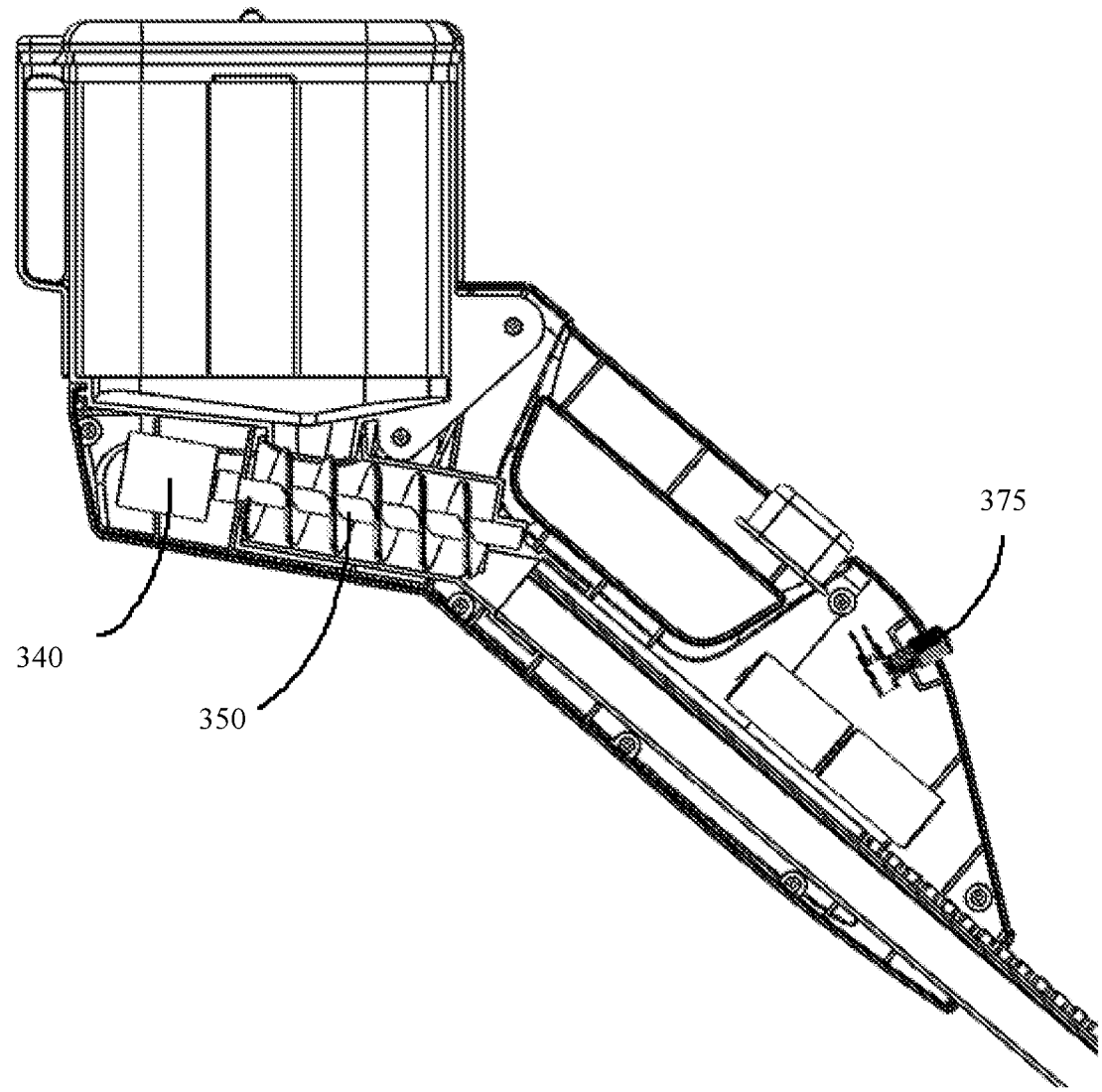
FIG. 12 is an illustration of a section view of the upper section of the motorized material dispensing apparatus of FIG. 11, according to some demonstrative embodiments
Figure 13:
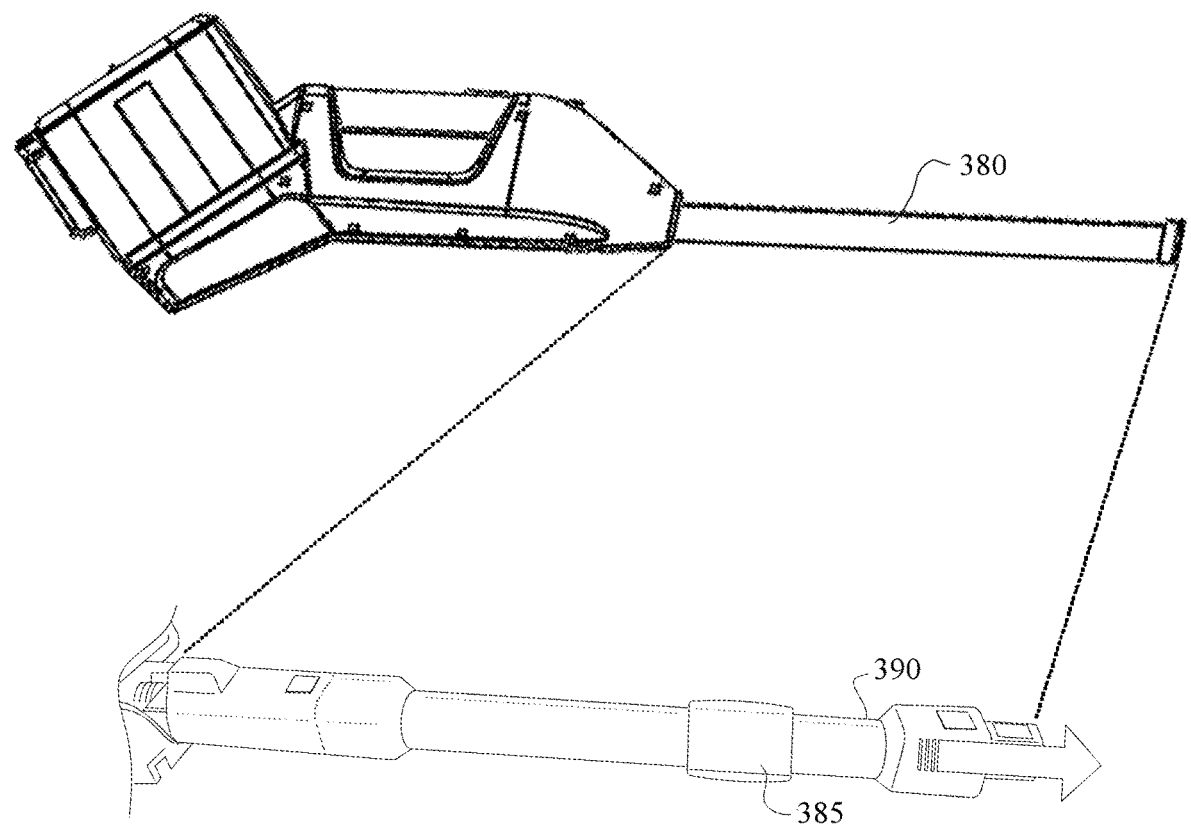
FIG. 13 is an illustration of a side view of the upper section of the motorized gardening material dispensing apparatus of FIG. 11 demonstrating an extendable telescopic conduit, according to some demonstrative embodiments Like reference numerals refer to like parts throughout the several views of the drawings.

Reference is now made to FIGS. 11, 12, 13, which described in detail the upper part of a motorized gardening material dispensing apparatus according to some demonstrating embodiments.

For example, FIG. 11 is an illustration of a front perspective view of an upper section of a motorized gardening material dispensing apparatus 300 according to some demonstrative embodiments. The motorized gardening material apparatus 300 may include a hopper top and a lid 310, an upper hopper 320, a base hopper 330, a motor 340, an auger 350, a first side of a handle 360, a second side of the handle 365, a motor speed controller 370 which may include a potentiometer and batteries and a downpipe 380, e.g., a dispensing conduit.

For example, FIG. 12 is an illustration of a section view of the upper section of the motorized gardening material dispensing apparatus 300 of FIG. 11, according to some demonstrative embodiments. FIG. 12 shows the motor 340, the auger 350, and a potentiometer 375 to control the rotation speed of the motor 340. For example, motor 340 may be an isolated motor.

FIG. 13 is an illustration of a side view of the upper section of the motorized gardening material dispensing apparatus 300 of FIG. 11 demonstrative an extendable telescopic conduit 390, e.g., distal conduit segment 158, according to some demonstrative embodiments. For example, FIG. 13 shows that the downpipe 380 extends deep into the handle and allowing for a long extension. The extendable telescopic conduit 390, e.g., distal conduit segment 158, may be coupled to downpipe 380 by a locking collar 385. The locking collar 385 may be configured to extend and retract the extendable telescopic conduit 390 into the downpipe 380.

In some demonstrative embodiments, the handle housing may include two halves, e.g., 360 and 365, which sandwich around internal components, e.g., the downpipe 380, e.g., a dispensing conduit, and the expandable hopper. The base of the hopper 330 may be captured by internal features within the handle halves, mechanically bonding it to the handle assembly, e.g., handle A-side 360 and handle B-side 365.

In some demonstrative embodiments, the hopper feeds into an auger tube, wherein a motor-driven auger 350 moves pellets from the hopper spout to the downpipe. The batteries 370 may be currently plotted to load into the nose area of the device under a potentiometer 375 (FIG. 12). For example, the potentiometer 375 (FIG. 12) may be used to control the motor speed.

In some demonstrative embodiments, the expanding hopper has a lid which snaps into place with permanent snaps not designed for disassembly. A lift-open cover may allow a user to refill the hopper with fertilizer and/or other materials.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. A gardening material dispensing apparatus configured for dispensing material, comprising:

a container assembly configured to contain a variable supply of the gardening material;

a dispensing conduit configured to flow the gardening material from the container assembly continually based on gravity to a selected area;

at least one material assembly operably coupled to the dispensing conduit and configured to control quantities of the gardening material by controlling a speed of rotation of an agitator impeller, wherein the dispensing conduit dispenses a predetermined amount of the gardening material continuously onto the selected area in a desired configuration; and a material distributor directly coupled to a vibrator and configured to break up the soil as the gardening material is dispensed onto the soil and mixes the gardening material with the broken-up soil-using vibrations of the vibrator.

2. The gardening material dispensing apparatus of claim 1, wherein the material agitator assembly comprises:

a bladed agitator impeller wherein one or more blades of the bladed agitator impeller are configured to rotate in the dispensing conduit to break up clumps and propel the gardening material and to allow a continuous flow of the gardening material.

3. The gardening material dispensing apparatus of claim 1 comprises:

the vibrator is configured to vibrate the dispensing conduit to provide a smooth flow of the gardening material.

4. The gardening material dispensing apparatus of claim 1, wherein the container assembly is configured to expand according to an amount of the supply and comprises an expandable hopper configured to be extended to accommodate the desired amount of material.

5. The gardening material dispensing apparatus of claim 1, wherein controlling the speed of rotation of the agitator impeller is done manually.

6. The gardening material dispensing apparatus of claim 1 further comprising:

an agitator motor configured to rotate the gardening material through a drive coupling;

a variable speed controller operably coupled to the agitator motor and configured to control a speed of the agitator motor, wherein the agitator motor is mounted on the dispensing conduit under the convertible container assembly and engaged to the bladed agitator.

7. The gardening material dispensing apparatus of claim 1 further comprising an agitator motor which is engaged to an auger.

8. The gardening material dispensing apparatus of claim 1 comprises:

a conduit hinge between a main conduit segment of a proximal conduit segment and a middle conduit segment wherein when the conduit hinge is configured to provide the folding ability to the dispensing apparatus.

9. The gardening material dispensing apparatus of claim 1 further comprising:

a discharge segment configured to provide a predetermined dispensing amount at the selected area.

10. The gardening material dispensing apparatus of claim 1 comprises:

a distal conduit segment configured to be telescopically extendable with respect to a middle conduit segment of the dispensing conduit.

11. The gardening material dispensing apparatus of claim 1, wherein the container assembly is configured to expend according to an amount of the supply and comprises an expandable hopper configured to be extended to accommodate the desired amount of material.

12. A gardening material dispensing apparatus configured for dispensing material, comprising:
- a container assembly configured to contain a variable supply of the gardening material;
- a dispensing conduit configured to flow the gardening material from the container assembly continually based on gravity to a selected area;
- at least one material agitator assembly operably coupled to the dispensing conduit and configured to control quantities of the gardening material by controlling a speed of rotation of an agitator impeller, wherein the dispensing conduit dispenses a predetermined amount of the gardening material continuously onto the selected area in a desired configuration; and
- a bladed agitator impeller having two or more radial blades positioned perpendicularly to the conduit segment around it configured to rotate in the dispensing conduit to break up clumps and propel the gardening material and to allow a continuous flow of the gardening material.

13. The gardening material dispensing apparatus of claim 12 further comprising a material distributor operably coupled to a vibrator and configured to break up the soil as the gardening material is dispensed onto the soil and mixes the gardening material with the broken-up soil-using vibrations of the vibrator.

14. The gardening material dispensing apparatus of claim 12, wherein controlling the speed of rotation of the agitator impeller is done manually.

15. The gardening material dispensing apparatus of claim 12 further comprising:
- an agitator motor configured to rotate the gardening material through a drive coupling; and
- a variable speed controller operably coupled to the agitator motor and configured to control a speed of the agitator motor, wherein the agitator motor is extended from the dispensing conduit is engaged to the bladed agitator impeller and located beneath the convertible container assembly at one end and to the dispensing conduit at another end.

16. The gardening material dispensing apparatus of claim 12 further comprising an agitator motor which is engaged to an auger.

17. The gardening material dispensing apparatus of claim 12, further comprising a conduit hinge between a main conduit segment of a proximal conduit segment and a middle conduit segment wherein when the conduit hinge is configured to provide the folding ability to the dispensing apparatus.

18. The gardening material dispensing apparatus of claim 12 further comprising a discharge segment configured to provide a predetermined dispensing amount at the selected area.

19. The gardening material dispensing apparatus of claim 12, further comprising a distal conduit segment configured to be telescopically extendable with respect to a middle conduit segment of the dispensing conduit.

20. The gardening material dispensing apparatus of claim 12 further comprising a vibrator configured to vibrate the dispensing conduit to provide a smooth flow of the gardening material.

* * * * *